US012683342B2

(12) United States Patent
Pudenz et al.

(10) Patent No.: US 12,683,342 B2
(45) Date of Patent: Jul. 14, 2026

(54) COAXIAL CONNECTOR THAT IS EASY TO ASSEMBLE AND ENSURES A RELIABLE ELECTRICAL CONTACT BETWEEN ELECTRICAL COMPONENTS THEREOF

(71) Applicant: SICK AG, Waldkirch (DE)

(72) Inventors: Florian Pudenz, Hamburg (DE); Björn Sock, Neu Wulmsdorf (DE); Christian Muenter, Hamburg (DE)

(73) Assignee: SICK AG, Waldkirch (DE)

( * ) Notice: Subject to any disclaimer, the term of this patent is extended or adjusted under 35 U.S.C. 154(b) by 286 days.

(21) Appl. No.: 18/381,787

(22) Filed: Oct. 19, 2023

(65) Prior Publication Data

US 2024/0136780 A1 Apr. 25, 2024
US 2024/0235133 A9 Jul. 11, 2024
US 2024/0396272 A9 Nov. 28, 2024

(30) Foreign Application Priority Data

Oct. 20, 2022 (DE) ..................... 10 2022 127 658.9

(51) Int. Cl.
*H01R 24/50* (2011.01)
*H01R 103/00* (2006.01)

(52) U.S. Cl.
CPC ......... *H01R 24/50* (2013.01); *H01R 2103/00* (2013.01)

(58) Field of Classification Search
CPC ... H01R 24/50; H01R 9/0515; H01R 13/2421
USPC ........................................... 439/63, 581, 700
See application file for complete search history.

(56) References Cited

U.S. PATENT DOCUMENTS 5,108,300 A * 4/1992 Weber ................ H01R 13/7033 439/903
5,397,252 A * 3/1995 Wang ................. H01R 13/6625 439/620.09
5,971,770 A * 10/1999 Richmond ............. H01R 24/50 439/63
7,014,480 B1 * 3/2006 Weidner ................. H01R 24/50 439/95

(Continued)

FOREIGN PATENT DOCUMENTS

CN 201503983 U 6/2010
CN 206313241 U 7/2017

(Continued)

OTHER PUBLICATIONS

Notice of Allowance dated May 14, 2025 issued in corresponding Japanese Application No. 2023-172053.

(Continued)

*Primary Examiner* — Hae Moon Hyeon
(74) *Attorney, Agent, or Firm* — Nath, Goldberg & Meyer; Jerald L. Meyer

(57) ABSTRACT

A coaxial connector for installation in a device housing comprises a base body that has a flange for placing the coaxial connector against a wall of the device housing, wherein at least two coaxial connection contacts and at least two circuit board contacts electrically connected thereto for connecting the coaxial connector to a circuit board arranged in the device housing are arranged at the base body. The circuit board contacts have axially movable contact pins that are spring-loaded in an extension direction facing away from the base body.

12 Claims, 5 Drawing Sheets

(56) References Cited

U.S. PATENT DOCUMENTS

| | | | | |
|---|---|---|---|---|
| 2013/0102187 | A1* | 4/2013 | Camelio | H01R 24/50 439/578 |
| 2016/0268716 | A1* | 9/2016 | Conger | H01R 12/716 |
| 2021/0203092 | A1* | 7/2021 | Jung | H01R 12/716 |
| 2022/0131301 | A1* | 4/2022 | Volkov | H01R 12/712 |
| 2022/0337007 | A1* | 10/2022 | Chen | H01R 13/6315 |

FOREIGN PATENT DOCUMENTS

| | | | | |
|---|---|---|---|---|
| CN | 215497189 | U | 1/2022 | |
| DE | 20117997 | U1 | 3/2002 | |
| DE | 202010003457 | U1 * | 6/2010 | H01R 13/2471 |
| EP | 2367239 | A1 | 9/2011 | |
| JP | H02-145785 | U | 12/1990 | |
| JP | H-05-144516 | A | 6/1993 | |
| JP | H7-198778 | A | 8/1995 | |
| JP | H9-330777 | A | 12/1997 | |
| JP | 2006-253148 | A | 9/2006 | |
| JP | 2017-41347 | A | 2/2017 | |
| KR | 1998-019369 | A | 6/1998 | |
| WO | 02/076793 | A1 | 10/2002 | |
| WO | WO-2011110309 | A1 * | 9/2011 | H01R 13/2421 |

OTHER PUBLICATIONS

Examination Report dated Jul. 17, 2023 issued in corresponding German Application No. 10 2022 127 658.9.

* cited by examiner

COAXIAL CONNECTOR THAT IS EASY TO ASSEMBLE AND ENSURES A RELIABLE ELECTRICAL CONTACT BETWEEN ELECTRICAL COMPONENTS THEREOF

TECHNICAL FIELD

The present invention relates to a coaxial connector for installation in a device housing, said coaxial connector comprising a base body that has a flange for placing the coaxial connector against a wall of the device housing, wherein at least two coaxial connection contacts and at least two circuit board contacts electrically connected thereto for connecting the coaxial connector to a circuit board arranged in the device housing are arranged at the base body.

Such coaxial connectors are in particular installed in devices that receive and/or transmit a high-frequency signal. For example, Radio Frequency Identification (RFID) reading devices and external antennas generally require an installed coaxial connector as a connection for a coaxial cable. Often, the coaxial connection contacts project from the flange and are to be guided to the outside through a bore of the device housing. However, it is also possible that the base body is to be guided to the inside through the bore. The flange placed against the wall of the device housing can be screwed and/or adhesively bonded to the wall.

DISCUSSION OF THE RELATED ART

The circuit board contacts can be configured for a direct soldering to the associated circuit board. In this case, a free space must, however, be provided in the device housing to first be able to insert the circuit board with the soldered-on coaxial connector into the device housing and to then be able to push the coaxial connection contacts through the bore. This costs valuable installation space. The coaxial connector can generally also be connected to the circuit board via an adapter cable. This is, however, associated with an increased assembly effort and high costs.

SUMMARY

It is an object of the invention to specify a coaxial connector that is easy to assemble and ensures a reliable contacting.

The object is satisfied by a coaxial connector having the features of claim 1.

In accordance with the invention, the circuit board contacts have axially movable contact pins that are spring-loaded in an extension direction facing away from the base body.

Due to the resilient contact pins, the coaxial connector can be installed when the circuit board is already assembled, wherein neither a laying of cables nor a soldering process is required. With the appropriate arrangement of the circuit board relative to the bore, the contact pins are automatically pressed together when the coaxial connector is inserted into the bore or when the circuit board is inserted into the housing, wherein there is a reliable contact with the conductor paths of the circuit board due to the spring force.

The contact pins can have a pin axis due to their shape, wherein the term “axial” refers to the pin axis.

The base body and/or the contact pins is/are preferably made of metal, in particular of brass.

In accordance with one embodiment of the invention, the contact pins are displaceably supported in a sleeve element fastened to the base body and are acted on by a compression spring arranged in the sleeve element. This enables a particularly simple design. The end positions of the contact pins, i.e. the maximum extended position and the maximum retracted position, can be predefined by corresponding abutments.

The contact pins preferably have rounded contact surfaces at the pin ends to ensure a reliable electrical contact even with minor position tolerances.

The contact pins can have pin axes that extend at right angles to a plug-in direction defined by the coaxial connection contacts. This means that the contact pins can be displaceable transversely to the connector orientation. In this embodiment, it is, for example, possible to place the circuit board, when the coaxial connector is already installed, onto the circuit board contacts in the transverse direction, i.e., for example, from above when the connector is seated laterally, so that the circuit board contacts are axially pressed together.

Alternatively, the contact pins can have pin axes that extend in parallel with or coincide with a plug-in direction defined by the coaxial connection contacts. This means that the contact pins can be displaceable in parallel with the connector orientation. This embodiment is in particular suitable for the connection to circuit boards that have an edge metallization or, for example, for arrangements in which the circuit board contacts are provided on the surface of the circuit board and the circuit board is inserted with the circuit board contacts facing in the direction of that housing wall through which the coaxial connection contacts pass and, for example, in parallel with this housing wall.

The coaxial connection contacts preferably have a hollow cylindrical external contact and an inner contact radially surrounded by the latter. This counteracts electromagnetic radiation.

A securing thread can be provided at the hollow cylindrical external contact for a screwing of the coaxial connector to a further coaxial connector. A particularly reliable high-frequency connection can be ensured via such a thread.

A further embodiment of the invention provides that a fixing thread is provided at the base body and cooperates with a knurled nut. By screwing the knurled nut onto the fixing thread, the base body can be reliably fastened to the device housing.

A seal can be arranged at the base body, in particular at the flange. This counteracts an entry of moisture into the device housing in the region of the coaxial connector. The seal can in particular be designed in accordance with Ingress Protection (IP) class 65 or 67.

Depending on the application, the coaxial connection contacts can be designed as a plug or as a socket. The coaxial connection contacts preferably form a Reverse-Polarity Threaded Neill-Concelman (R-TNC) connector.

A further embodiment of the invention provides that at least three circuit board contacts having respective axially movable contact pins spring-loaded in an extension direction facing away from the base body are arranged at the base body, with at least two of the at least three circuit board contacts being electrically connected to a ground contact of the coaxial connection contacts, in particular an external contact. This has proven to be particularly favorable. Exactly three circuit board contacts are preferably provided.

Further developments of the invention can be seen from the dependent claims, from the description and from the enclosed drawings.

BRIEF DESCRIPTION OF THE DRAWINGS

The invention will be described in the following by way of example with reference to the drawing.

DETAILED DESCRIPTION OF THE EMBODIMENTS

Figure 1:
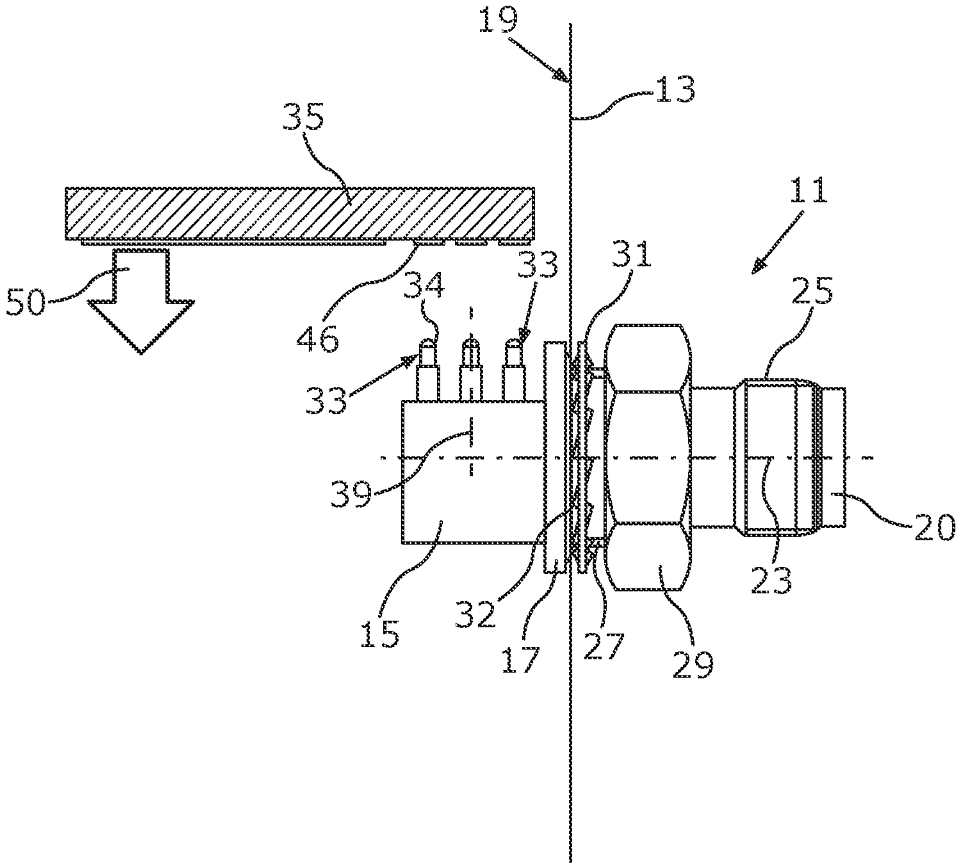
FIG. 1 is a side view of a coaxial connector in accordance with a first embodiment of the invention and of a circuit board to be connected to the coaxial connector.
Figure 2:
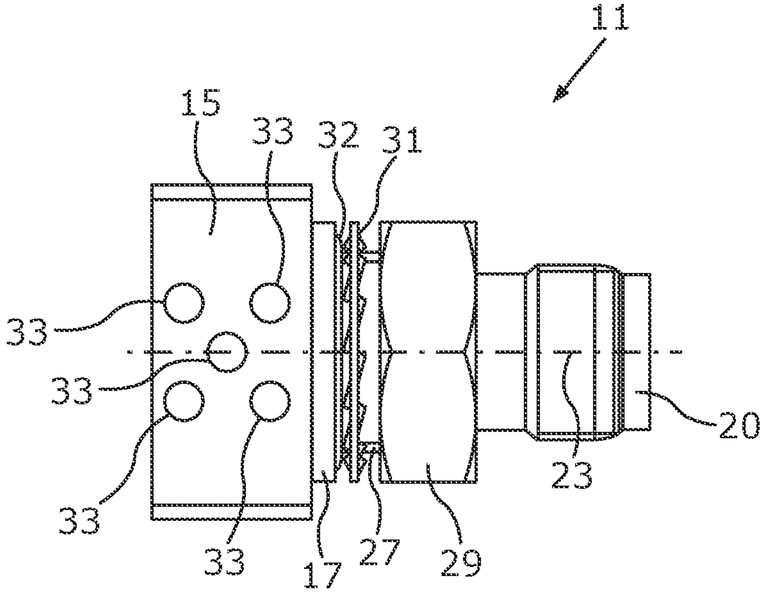
FIG. 2 shows the coaxial connector in accordance with FIG. 1 from above.

The coaxial connector 11 shown in FIGS. 1 and 2 and designed in accordance with a first embodiment of the invention is provided for installation in an only partly shown device housing 13 and has a base body 15 composed of metal, preferably of brass. The base body 15 is equipped with a flange 17 that can be placed against the inner wall 19 of the device housing 13. Two coaxial connection contacts, of which only the external contact 20 is visible in FIGS. 1 and 2, project from the flange 17 in a generally known manner. Said external contact is hollow-cylindrical and radially surrounds an inner contact, wherein a connector axis 23 is predefined by the cylinder axis.

A securing thread 25 is provided at the external contact 20 for a screwing of the coaxial connector 11 to a further coaxial connector, not shown. Alternatively, a bayonet fastening or the like could also be provided to secure the connection. To fix the base body 15 to the device housing 13, a fixing thread 27 is furthermore provided that cooperates with a knurled nut 29.

To install the coaxial connector 11 in the device housing 13, the external contact 20 and the inner contact are guided outwardly through a bore of the device housing 13 and the flange 17 is directly or indirectly placed against the inner wall 19 of the device housing 13. The knurled nut 29 is then screwed to the fixing thread 27, preferably with the interposition of a spring ring 31. A seal 32 arranged at the flange 17 counteracts an entry of moisture and dirt into the device housing 13.

Figure 3:
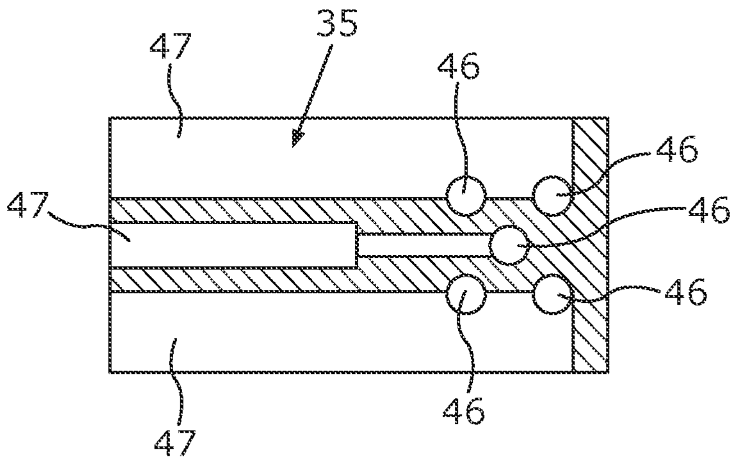
FIG. 3 shows the circuit board in accordance with FIG. 1 from below.

Five circuit board contacts 33 composed of metal are arranged at the base body 15, one of which is electrically connected to the inner contact and four of which are electrically connected to the external contact 20. The circuit board contacts 33 serve to connect the coaxial connector 11 to a circuit board 35 arranged in the device housing 13. As shown in FIG. 3, said circuit board 35 has respective contact surfaces 46 that are associated with the circuit board contacts 33 and that are in electrical connection with conductor paths 47.

Figure 4:
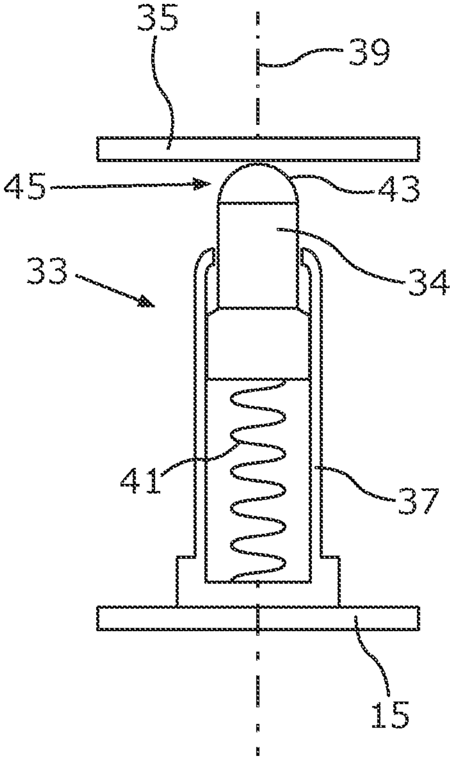
FIG. 4 is a sectional representation of a circuit board contact of the coaxial connector in accordance with FIG. 1.

As can be seen in the individual representation in accordance with FIG. 4, each of the circuit board contacts 33 has a contact pin 34 that is displaceably supported in a sleeve element 37, which is fastened to the base body 15, in parallel with a pin axis 39. Respective compression springs 41 that preload the contact pins 34 into an extension position facing away from the base body 15 are located in the sleeve elements 37. As shown, the contact pins 34 have rounded contact surfaces 43 at the pin ends 45. In the embodiment shown in FIGS. 1 and 2, the pin axes 39 of the contact pins 34 extend at right angles to the connector axis 23.

When assembling the device, the circuit board 35 is inserted into the device housing 13 in a direction of assembly 50, for example from top to bottom as shown in FIG. 1, wherein the contact pins 34 contact surfaces 46 of the circuit board 35 in each case associated with them and are displaced against the force of the compression springs 41 (FIG. 4). This means that the circuit board contacts 33 are pressed together. The circuit board 35 is then fastened, for example screwed and/or adhesively bonded, in the device housing 13.

The contact pins 34 that press against the contact surfaces 46 ensure a reliable contacting without a complex soldering or plug-in process being required. A mechanical stress on the coaxial connector 11 is decoupled from the circuit board 35 since the connection has a flexibility via the resilient contact pins 34.

Figure 5:
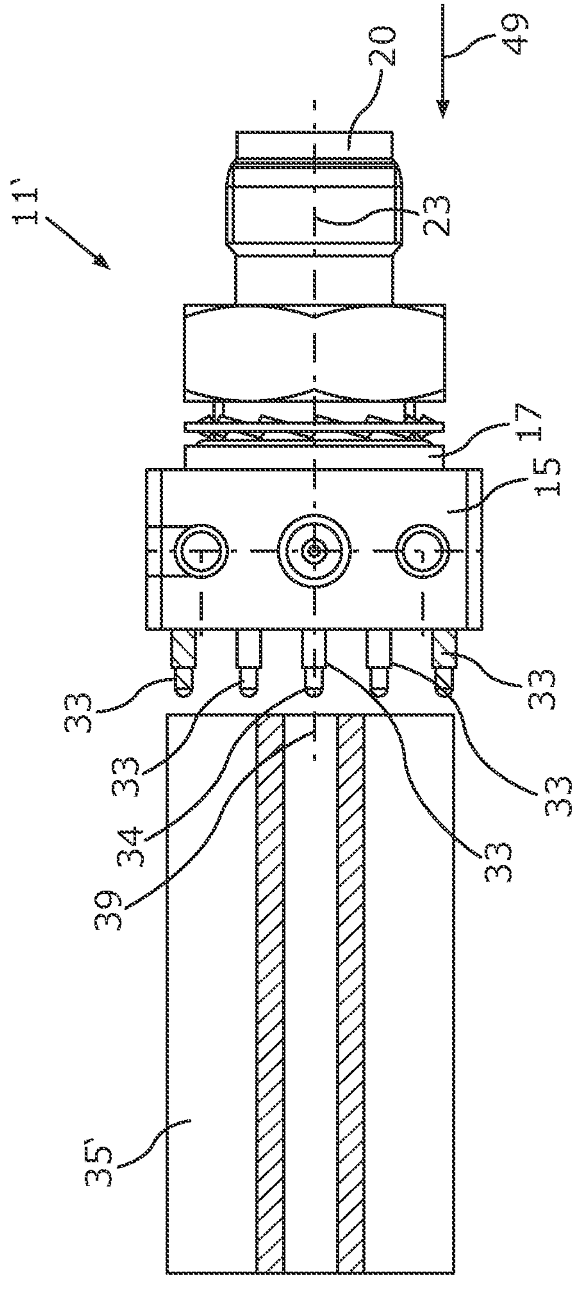
FIG. 5 is a side view of a coaxial connector in accordance with a second embodiment of the invention and of a circuit board to be connected to the coaxial connector.

FIG. 5 shows a coaxial connector 11' in accordance with an alternative embodiment of the invention. In principle, it is designed in the same way as the coaxial connector 11 described above, but in contrast thereto it has contact pins 34 whose pin axes 39 extend in parallel with the connector axis 23 and are accordingly displaceable in the connector orientation. This means that the contact pins 34 extend in parallel with the plug-in direction 49 here. A circuit board 35' with edge metallization guided towards the base body 15 against the plug-in direction 49 can be connected in a simple manner to the coaxial connector 11' designed in accordance with FIG. 5.

The invention enables a tight and high-frequency-capable connection of an RFID reading device or the like to a coaxial cable, wherein the assembly of the associated coaxial connector 11, 11' can take place particularly quickly and easily.

REFERENCE NUMERAL LIST

11, 11' coaxial connector
13 device housing
15 base body
17 flange
19 inner wall
20 external contact
23 connector axis
25 securing thread
27 fixing thread
29 knurled nut
31 spring ring
32 seal
33 circuit board contact
34 contact pin
35, 35' circuit board
37 sleeve element
39 pin axis
41 compression spring
43 rounded contact surface
45 pin end
46 contact surface
47 conductor path
49 plug-in direction
50 direction of assembly

The invention claimed is:

1. A coaxial connector for installation in a device housing, said coaxial connector comprising a base body that has a flange for placing the coaxial connector against a wall of the device housing, wherein at least two coaxial connection contacts and at least two circuit board contacts electrically connected thereto for connecting the coaxial connector to a circuit board arranged in the device housing are arranged at the base body, wherein the circuit board contacts have axially movable contact pins that are spring-loaded in an extension direction facing away from the base body.

2. The coaxial connector in accordance with claim 1, wherein the contact pins are displaceably supported in a sleeve element fastened to the base body and are acted on by a compression spring arranged in the sleeve element.

3. The coaxial connector in accordance with claim 1, wherein the contact pins have rounded contact surfaces at the pin ends.

4. The coaxial connector in accordance with claim 1, wherein the contact pins have pin axes that extend at right angles to a plug-in direction defined by the coaxial connection contacts.

5. The coaxial connector in accordance with claim 1, wherein the contact pins have pin axes that extend in parallel with or coincide with a plug-in direction defined by the coaxial connection contacts.

6. The coaxial connector in accordance with claim 1, wherein the coaxial connection contacts have a hollow cylindrical external contact and an inner contact radially surrounded by the latter.

7. The coaxial connector in accordance with claim 6, wherein a securing thread is provided at the hollow cylindrical external contact for a screwing of the coaxial connector to a further coaxial connector.

8. The coaxial connector in accordance with claim 1, wherein a fixing thread is provided at the base body and cooperates with a knurled nut.

9. The coaxial connector in accordance with claim 1, wherein a seal is arranged at the base body.

10. The coaxial connector in accordance with claim 9, wherein the seal is arranged at the flange.

11. The coaxial connector in accordance with claim 1, wherein at least three circuit board contacts having respective axially movable contact pins spring-loaded in an extension direction facing away from the base body are arranged at the base body, with at least two of the at least three circuit board contacts being electrically connected to a ground contact of the coaxial connection contacts.

12. The coaxial connector in accordance with claim 11, wherein the ground contact of the coaxial connection contacts is an external contact.

* * * * *